United States Patent
Kornegay et al.

(10) Patent No.: US 11,147,371 B2
(45) Date of Patent: Oct. 19, 2021

(54) APPLIANCE TEST CABINET

(71) Applicants: BSH Home Appliances Corporation, Irvine, CA (US); BSH Hausgeräte GmbH, Munich (DE)

(72) Inventors: Brandon Kornegay, New Bern, NC (US); Larry Leonard, Four Oaks, NC (US); Robert Zusi, New Bern, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 92 days.

(21) Appl. No.: 16/451,250

(22) Filed: Jun. 25, 2019

(65) Prior Publication Data
US 2020/0405052 A1    Dec. 31, 2020

(51) Int. Cl.
| | |
|---|---|
| *A47B 81/00* | (2006.01) |
| *G09B 23/16* | (2006.01) |
| *A47B 45/00* | (2006.01) |
| *A47B 77/08* | (2006.01) |

(52) U.S. Cl.
CPC .............. *A47B 81/00* (2013.01); *A47B 45/00* (2013.01); *G09B 23/16* (2013.01); *A47B 77/08* (2013.01)

(58) Field of Classification Search
CPC ......... G09B 23/16; A47B 81/00; A47B 77/08; A47B 77/02; A47B 77/10; A47B 81/062; A47B 45/00; F24C 15/30
USPC .... 312/236, 237, 205, 270.3, 198, 207, 204, 312/140.2, 273, 140.1, 140.3, 301, 201,
(Continued)

(56) References Cited

U.S. PATENT DOCUMENTS 2,260,586 A * 10/1941 Sheldon ................ A47B 69/00
                                                        312/140.2
3,051,160 A *  8/1962 Nielsen ................. A47B 77/08
                                                        126/37 R
(Continued)

FOREIGN PATENT DOCUMENTS

| CN | 105832007 A | 8/2016 |
| CN | 106419184 A | 2/2017 |
| JP | H05337012 A | 12/1993 |

OTHER PUBLICATIONS

Approach Adjustable Cooktop; Manufacturer: Populas Furniture Source: Online: PopulasFurniture.com Publication Date: Unknown. Accessed Aug. 27, 2018.

*Primary Examiner* — Hiwot E Tefera
(74) *Attorney, Agent, or Firm* — Michael E. Tschupp; Andre Pallapies; Brandon G. Braun

(57) ABSTRACT

A test cabinet for testing a heat generating appliance includes a base having a main structure, a front panel, a rear panel, and a top panel, the top panel being movable relative to the main structure, the front panel extending in a longitudinal direction of the cabinet; a front opening in the front panel, the front opening providing access to an appliance compartment in the base, the appliance compartment being configured to receive the heat generating appliance; a back wall positioned above the top panel and movable relative to the main structure, the back wall being movable in a depth direction of the cabinet, the depth direction being perpendicular to longitudinal direction of the cabinet; and a bottom insert that is removably mounted in the base, the bottom insert forming a floor of the appliance compartment.

10 Claims, 16 Drawing Sheets

(58) Field of Classification Search
USPC .............. 312/409; 374/100, 163, 208, 141; 126/37 R, 37 B
See application file for complete search history.

(56) References Cited

U.S. PATENT DOCUMENTS

| | | | | |
|---|---|---|---|---|
| 3,353,885 | A * | 11/1967 | Hanson | A47B 45/00 312/205 |
| 3,899,228 | A * | 8/1975 | Schreiber | A47B 96/00 312/257.1 |
| 3,983,583 | A * | 10/1976 | Herman | A47B 69/00 62/331 |
| 4,518,142 | A * | 5/1985 | Sulcek | A47B 91/02 248/188.2 |
| 4,669,790 | A * | 6/1987 | Briggs | A47B 21/03 312/223.3 |
| 5,073,997 | A * | 12/1991 | Rabe | E03C 1/18 4/629 |
| 6,283,563 | B1 * | 9/2001 | Lambright | A47B 45/00 312/203 |
| 8,303,175 | B2 | 11/2012 | Kornegay | |
| 9,872,573 | B1 * | 1/2018 | Yates | A47B 46/005 |
| 2004/0012311 | A1 * | 1/2004 | Nielsen | A47B 45/00 312/205 |
| 2007/0114893 | A1 * | 5/2007 | Styka | A47B 88/994 312/228 |
| 2007/0188057 | A1 * | 8/2007 | McGowan | A47B 81/06 312/7.2 |
| 2008/0122329 | A1 * | 5/2008 | Adrian | A47B 96/20 312/294 |
| 2008/0169734 | A1 * | 7/2008 | Bartels | A47B 81/06 312/7.2 |
| 2012/0146475 | A1 * | 6/2012 | Currie | F24C 15/30 312/334.6 |
| 2014/0132129 | A1 * | 5/2014 | Deneweth | A47B 77/022 312/140.2 |

* cited by examiner

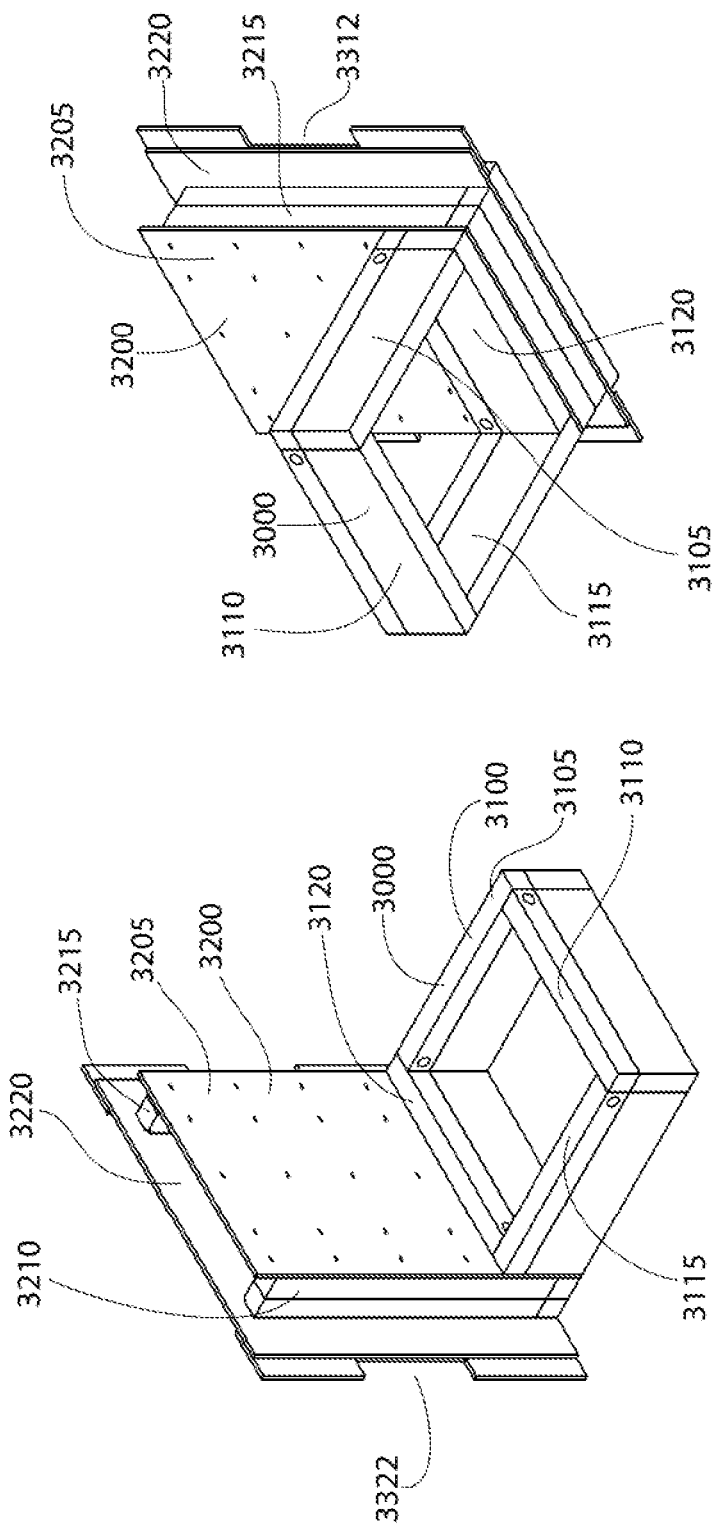

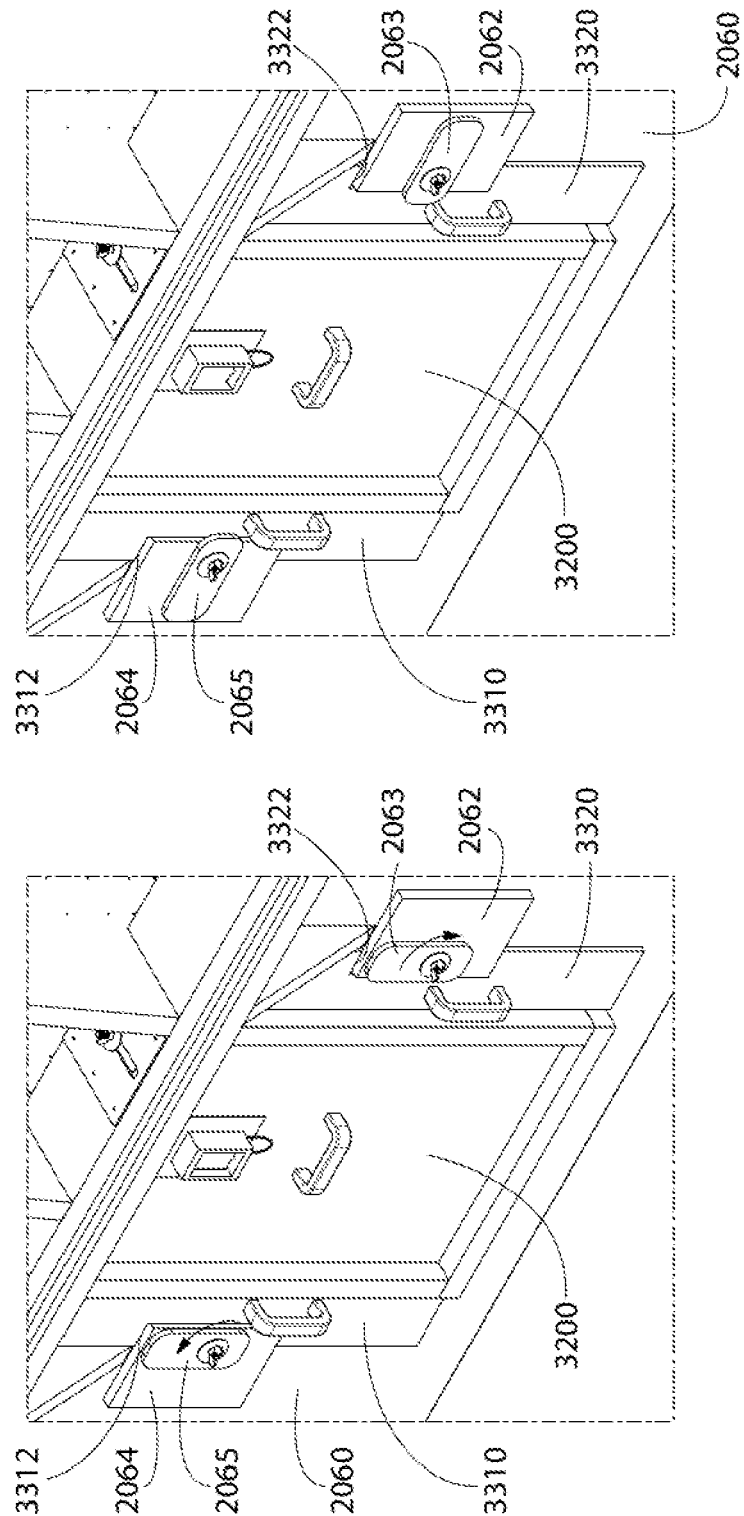

APPLIANCE TEST CABINET

FIELD OF THE INVENTION

The invention is directed to a test cabinet for an appliance. More particularly, embodiments of the invention are directed to an adjustable test cabinet for testing different sizes of heat generating appliances.

An example of an application for the invention is an adjustable cabinet for testing the heat present at locations adjacent the exterior of a domestic kitchen cooking appliance.

BACKGROUND OF THE INVENTION

Some modern domestic kitchens include cooking appliances such as ovens and ranges that provide heat for cooking a food item in a cooking compartment of the appliance. A portion of the heat produced by the appliance is transferred to the environment outside of the appliance. The specific temperatures on the outside of appliances are limited by government regulations and other constraints. Testing appliances during the development of the appliances is necessary to ensure that all required heat and temperature constraints are met. Many kitchen appliances are built in to cabinets or other enclosed areas in modern kitchens. As a result, a reliable and efficient means of testing these appliances, that come in many sizes, is desirable.

Applicants recognized an improvement to the above arrangement and implement that improvement in embodiments of the invention.

SUMMARY

The invention achieves the benefit of providing an adjustable test cabinet that is easily reconfigured for testing different combinations of different sized ovens and cooktops.

Particular embodiments of the invention are directed to a test cabinet for testing a heat generating appliance. The cabinet includes a base having a main structure, a front panel, a rear panel, and a top panel, the top panel being movable relative to the main structure, the front panel extending in a longitudinal direction of the cabinet; a front opening in the front panel, the front opening providing access to an appliance compartment in the base, the appliance compartment being configured to receive the heat generating appliance; a back wall positioned above the top panel and movable relative to the main structure, the back wall being movable in a depth direction of the cabinet, the depth direction being perpendicular to longitudinal direction of the cabinet; and a bottom insert that is removably mounted in the base, the bottom insert forming a floor of the appliance compartment.

Some embodiments further include a compartment inside wall moveably mounted to the base, the compartment inside wall forming an interior wall of the appliance compartment, the compartment inside wall being movable in the longitudinal direction of the cabinet.

Other embodiments of the invention are directed to a test cabinet for testing a heat generating appliance. The cabinet includes a base having a main structure, a front panel, a rear panel, and a top panel, the top panel being movable relative to the main structure, the front panel extending in a longitudinal direction of the cabinet; a front opening in the front panel, the front opening providing access to an appliance compartment in the base, the appliance compartment being configured to receive the heat generating appliance; a compartment inside wall moveably mounted to the base, the compartment inside wall forming an interior wall of the appliance compartment, the compartment inside wall being movable in the longitudinal direction of the cabinet; and a bottom insert that is removably mounted in the base, the bottom insert forming a floor of the appliance compartment.

Other embodiments of the invention are directed to a test cabinet for testing a heat generating appliance. The cabinet includes a base having a main structure, a front panel, a rear panel, and a top panel, the front panel extending in a longitudinal direction of the cabinet; a front opening in the front panel, the front opening providing access to an appliance compartment in the base, the appliance compartment being configured to receive the heat generating appliance; a compartment inside wall moveably mounted to the base, the compartment inside wall forming an interior wall of the appliance compartment, the compartment inside wall being movable in the longitudinal direction of the cabinet; and a rear insert, the rear insert having a compartment rear wall that forms an interior rear wall of the appliance compartment.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein:

FIG. 12 is a front upper perspective view of a part of the test cabinet shown in

FIG. 1;

FIG. 13 is a front lower perspective view of the part shown in FIG. 12;

FIG. 16 is a magnified view of the area indicated in FIG. 3 in an unlocked state;

FIG. 17 is a magnified view of the area indicated in FIG. 3 in a locked state;

DETAILED DESCRIPTION

Figure 1:
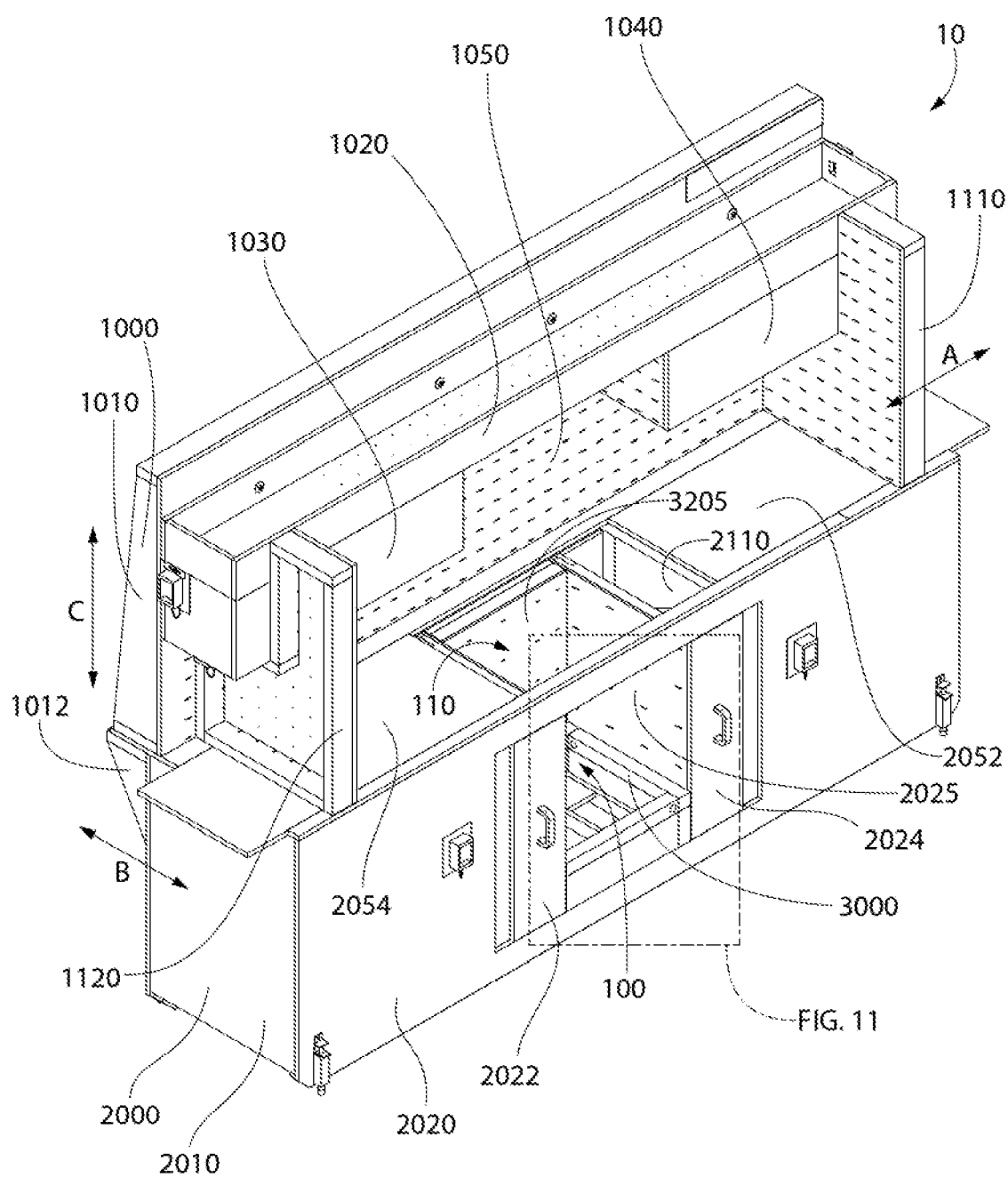
FIG. 1 is a front upper perspective view of an exemplary test cabinet in accordance with embodiments of the invention.

The invention is described herein with reference to the accompanying drawings in which exemplary embodiments of the invention are shown. The invention may, however, be embodied in many different forms and should not be construed as limited to the embodiments set forth herein.

As explained above, embodiments of the invention provide an improvement to testing of heat producing appliances. Ovens and cooktops are available in a great number of sizes and combinations. Testing of ovens and cooktops is required to ensure that these products conform to safety and regulatory requirements. Test cabinets are used to simulate the environment in which an oven and/or cooktop can be installed. With the multitude of different size ovens and cooktops available, multiple test cabinets are required or, with certain test cabinets, particular pieces need to be disassembled and reconfigured (often requiring a carpenter or other skilled construction worker) in order to accommodate an oven or cooktop of a different size. Due to the great number of different sized ovens and cooktop, and the even greater number of possible combinations of the two, it would be advantageous to have a test cabinet that can be adjusted to fit the multitude of different ovens and/or cooktops without needing reconstruction. Embodiments of the invention provide a solution to this problem by providing test cabinets that have adjustable features designed specifically for testing ovens and cooktops.

FIGS. 1-4 show a test cabinet 10 in accordance with an exemplary embodiment of the invention. In this example, test cabinet 10 has a base 2000 that has a main structure that supports the various parts and features of cabinet 10. While particular features and combinations of features are shown in the drawings, it is noted that particular embodiments of the invention provide some or all of the features shown, in any possible combination.

Base 2000 has, in this example, a left side panel 2010, a front panel 2020, a right side panel 2030, a bottom panel 2040, two top panels 2052, 2054, and a rear panel 2060. In this example, a top surface of base 2000 is formed by the two top panels 2052, 2054. Between top panels 2052, 2054, is an opening 110 in the top surface to receive a cooktop or other insert. The cooktop can be a cooktop that is being tested in cabinet 10, or it could be a cooktop that is being placed in cabinet 10 in order to provide the required testing environment for an oven being tested in cabinet 10. In some instances, an insert is placed in opening 110 in the top surface instead of a cooktop. For simplicity, the term cooktop is used in this disclosure to represent any cooktop or other insert that is placed in the top surface of base 2000. Top panels 2052, 2054 slide in the direction of arrow A to accommodate cooktops of various widths. For example, cooktops having a nominal width of 24 inches, 30 inches, 36 inches, or any other size can be accommodated in base 2000 by sliding top panels 2052, 2054 in the direction of arrow A to make opening 110 in the top surface the correct size for the particular cooktop. Some embodiments include an additional filler piece to make opening 110 smaller in the direction of arrow B to accommodate particular size cooktops.

Base 2000, in this example, includes two adjustable portions that allow adjustment of the size of an opening in front panel 2020. The opening in front panel 2020 is adjustable to accommodate various widths of ovens in cabinet 10. For example, ovens having a nominal width of 24 inches, 27 inches, 30 inches, or any other size can be accommodated in base 2000 by sliding inserts 2022, 2024 in the direction of arrow A to make the opening in front panel 2020 the correct size for the particular oven. Inside side walls of compartment 100 in which the oven in placed are movable to conform to various regulatory requirements regarding the testing of ovens. In this example, a compartment inside wall 2025 is a part of insert 2024 and moves with the front portion of insert 2024. A similar arrangement exists with insert 2022. In this example, as the front portion of insert 2024 is moved in the direction of arrow A, compartment inside wall 2025 moves the same amount in the direction of arrow A. In this manner, the width (dimension in the direction of arrow A) of compartment 100 is adjusted to accommodate an oven of a particular width while setting the spacing between the compartment inside walls and the oven at the required spacing (by regulation, for example). In other embodiments, compartment inside wall 2025 is separate from the front portion of insert 2024, and moves independently therefrom.

In embodiments, base 2000 has two fixed walls 2110 that are outside of compartment 100. Fixed walls 2110 create a sealed cabinet by sealing off the area laterally outside of compartment 100 in cases where a gap exists between the top of compartment inside walls 2025 and the underside of top panels 2052, 2054. This can be useful in cases where a cooktop wider than the oven is being tested.

In embodiments, compartment 100 that receives the oven being tested also includes an adjustable/replaceable bottom insert 3000 that, in this example, provides adjustability in the elevation of the bottom surface of compartment 100. Different ovens and/or testing criteria require the bottom surface of compartment 100 to be located at different elevations. For example, particular testing criteria might require the top surface of the oven being tested to be a set number of inches below the bottom of a cooktop mounted in cabinet 10. For a given cooktop, ovens of differing overall height require the bottom surfaces of the ovens to be set at different elevations. In embodiments, an appropriate one (or more) of a plurality of bottom inserts 3000 is chosen to locate the bottom of the oven (and therefore, the top of the oven) at the desired elevation. In embodiments, bottom insert 3000 is adjustable, for example with a ratcheting system and/or a hydraulic system, such that the elevation of an upper surface 3100 (see FIG. 12) of bottom insert 3000 can be adjusted. The adjustable/replaceable feature of bottom insert 3000 allows a testing technician to easily alter the elevation of the bottom surface of compartment 100 to accommodate different height ovens.

In embodiments, compartment 100 includes an adjustable/replaceable rear insert 3200 that, in this example, provides adjustability in the position of a compartment rear wall 3205 of compartment 100. Different ovens and/or testing criteria can require the rear wall of compartment 100 to be located at different positions. For example, particular testing criteria might require the rear wall of compartment 100 be located a set number of inches from a rear surface of the oven being tested in cabinet 10. Different ovens can have different overall depths and, as a result, an easily movable rear wall of compartment 100 allows ovens of different depths to be easily tested. The adjustable/replaceable feature of rear insert 3200 allows a testing technician to easily alter the depth of compartment 100 to accommodate different oven depths.

In the above example, rear insert 3200 and bottom insert 3000 are two separate pieces. In other embodiments, rear insert 3200 and bottom insert 3000 are fixed together as one part.

Combinations of possible positions of top panels 2052, 2054, inserts 2022, 2024, compartment inside walls 2025, rear insert 3200, and bottom insert 3000 provide a large amount of adjustability that allows cabinet 10 to be easily used with many different sizes and combinations of ovens and cooktops.

Cabinet 10, in this example, also has an upper structure 1000 that is positioned on top of base 2000. Upper structure 1000 has various parts that simulate kitchen walls and cabinets for the purpose of testing cooktops positioned in opening 110. In embodiments, upper structure 1000 moves in the direction of arrow B such that the position of a back wall 1050 is adjustable relative to opening 110 in base 2000. This adjustment allows the positioning of back wall 1050 at a set distance from cooktops having different depths in the direction of arrow B. Particular regulations require a maximum limitation of the temperature of a back wall that is a set distance from a cooktop. The adjustability of back wall 1050 allows cabinet 10 to be adjusted to provide the required distance for a variety of cooktop depths. This example uses four sliding and holding mechanisms 1001 (FIG. 3) that each include a plate having a slot, a washer, a bolt, and a wing nut. Other sliding and holding mechanisms can also be used. In this embodiment, end caps 1010 of upper structure 1000 are trapezoidal in shape to provide a sturdy attachment point to base 2000 while simultaneously reducing the weight of upper structure 1000.

Figure 10:
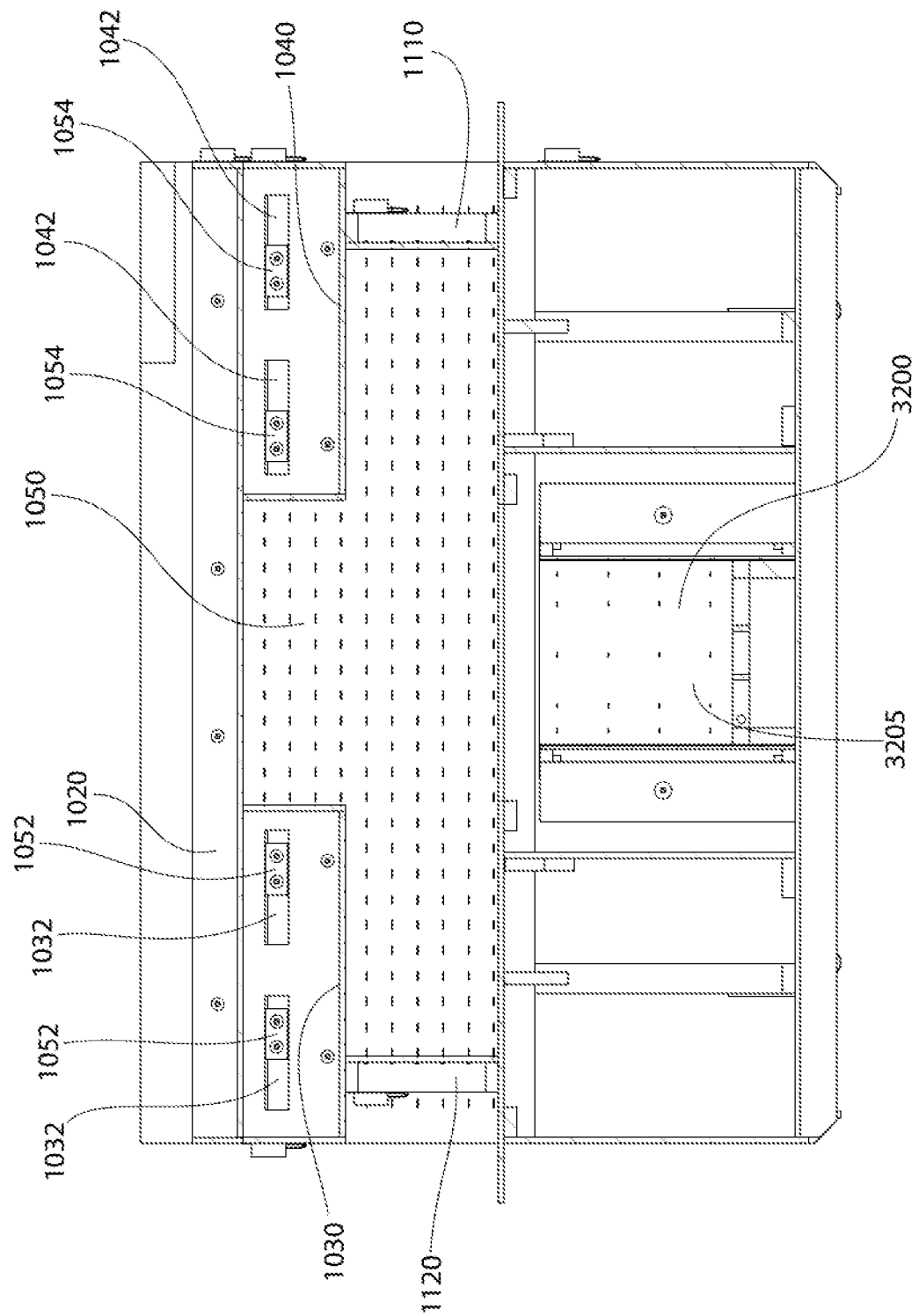
FIG. 10 is a sectional view of the door shown in FIG. 1 taken along section line X-X in FIG. 8.

In this example, a top portion 1020 and two blocks 1030, 1040 are attached to back wall 1050 to simulate kitchen cabinets positioned above the countertop in which the cooktop is installed. In this example, blocks 1030, 1040 are adjustable in the direction of arrow A. This adjustment of blocks 1030, 1040 allows them to be moved to correspond to cooktops of different widths in the direction of arrow A in order to comply with certain testing protocols, which may be different for gas cooktops and electric cooktops. An example of the adjustment mechanism used for blocks 1030, 1040 is shown in FIG. 10 (discussed in detail below). Blocks 103, 1040 are also removable so that blocks of different dimensions (in one or more of the directions of arrows A, B and/or C) can be attached to back wall 1050. In this example, top portion 1020 can be unbolted from back wall 1050 and moved in the direction of arrow C. In other embodiments, top portion 1020 is mounted on sliding, or other mechanisms that permit top portion to me moved in the direction of arrow C. Top portion 1020 can be replaced with a top portion 1020 that has different dimensions (in one or more of the directions of arrows A, B and/or C).

This example includes side walls 1110, 1120 that are positioned above base 2000. Side walls 1110, 1120 are movable in the direction of arrow A to locate side walls 1110, 1120 a set distance from opening 110 (and thus a cooktop in opening 110) such that the set distance can be maintained for cooktops having different widths in the direction of arrow A. Particular regulations require a maximum limitation of the temperature of side walls that are a set distance from a cook top. The adjustability of side walls 1110, 1120 allows cabinet 10 to be adjusted to provide the required distance for a variety of cooktop widths.

In this example, side walls 1110, 1120 are notched to permit movement in the direction of arrow A relative to blocks 1030, 1040. This feature is particularly useful in that it allows the movement of side walls 1030, 1040 without moving blocks 1030, 1040. Similarly, this feature allows the movement of blocks 1030, 1040 without moving side walls 1030, 1040. In some embodiments, each side wall 1030, 1040 can be fixed to one of blocks 1030, 1040 to provide set spacing between an edge of the cooktop and side walls 1030, 1040.

Figure 2:
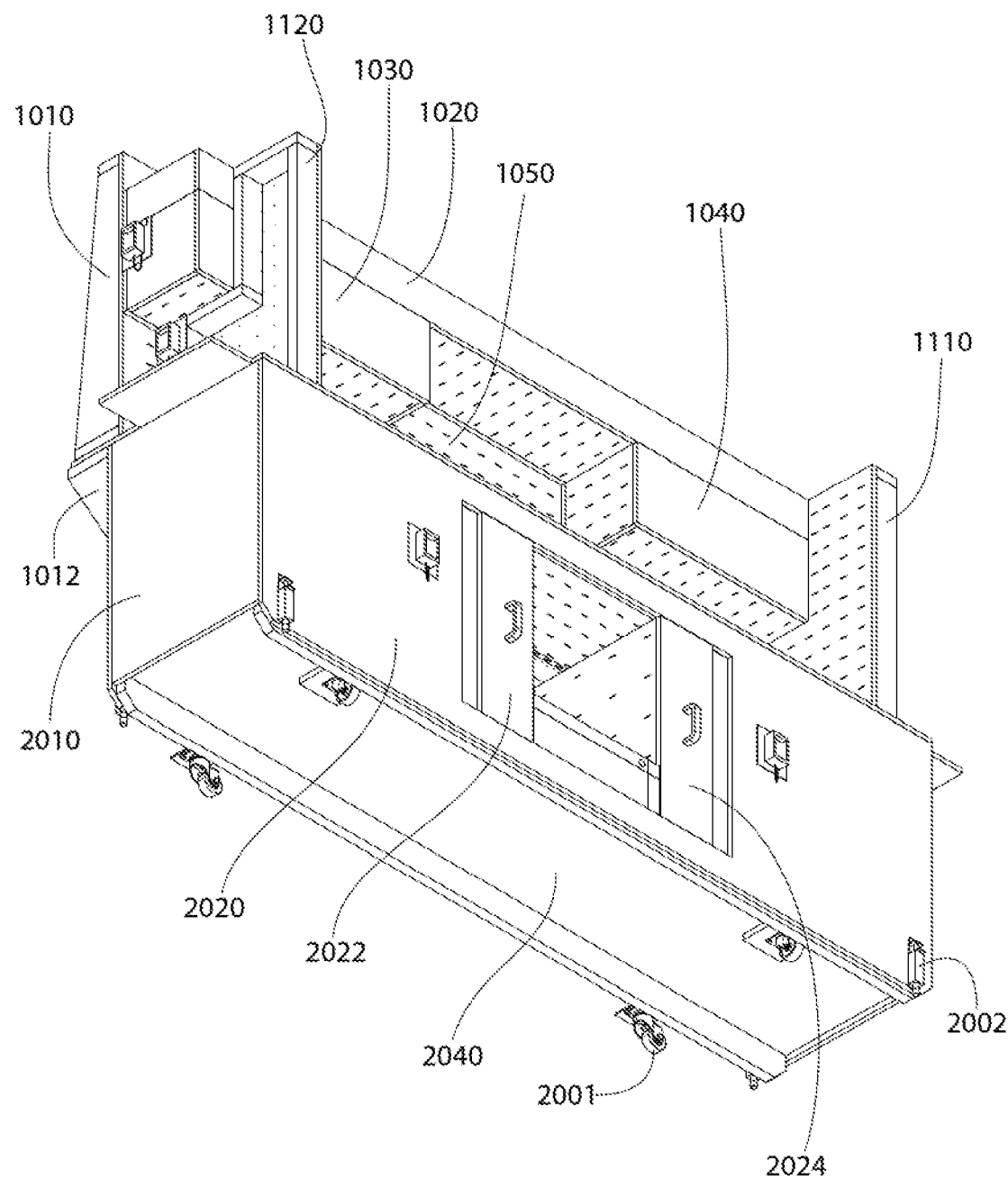
FIG. 2 is a front lower perspective view of the test cabinet shown in FIG. 1.
Figure 3:
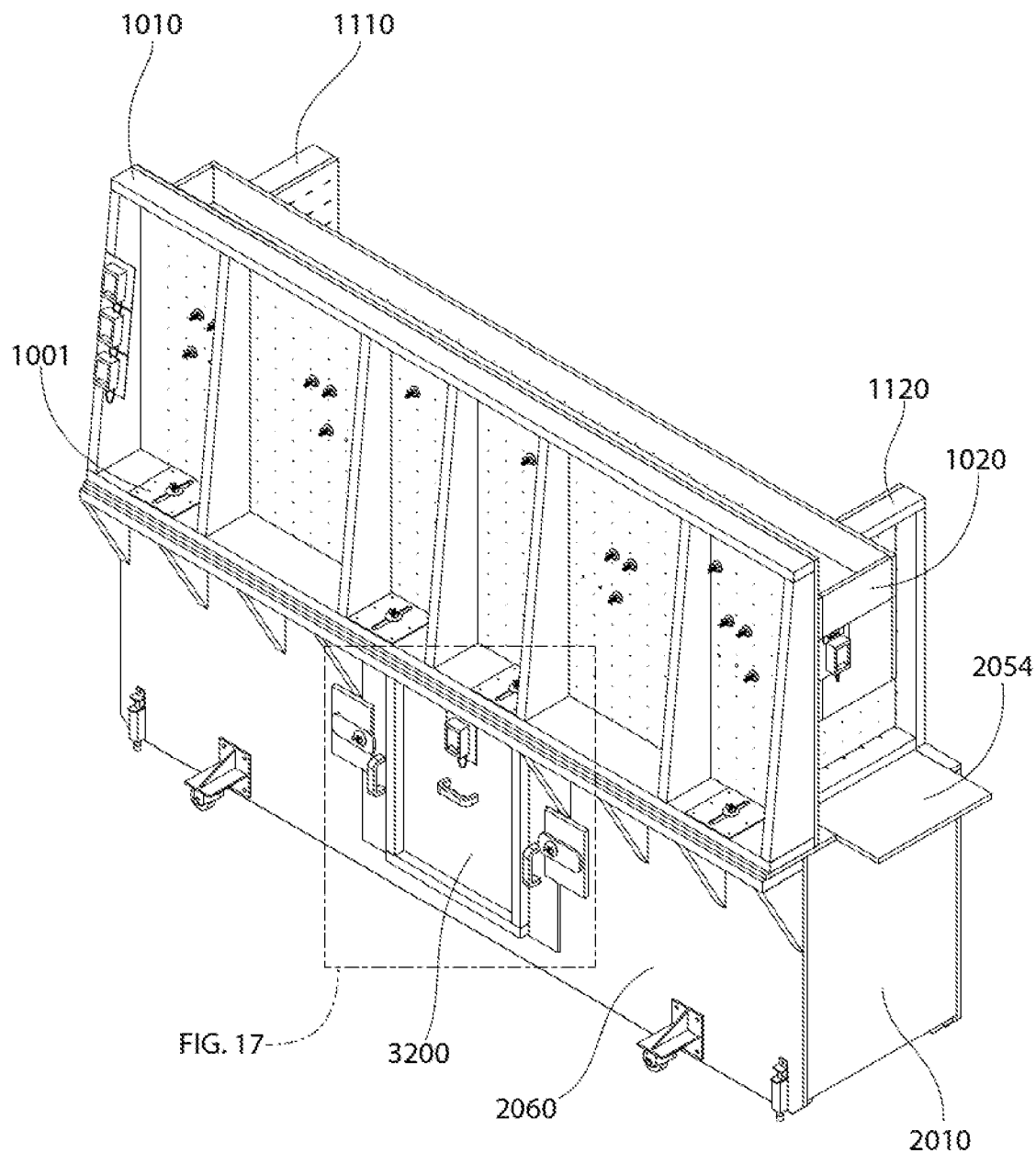
FIG. 3 is a rear upper perspective view of the test cabinet shown in FIG. 1.
Figure 4:
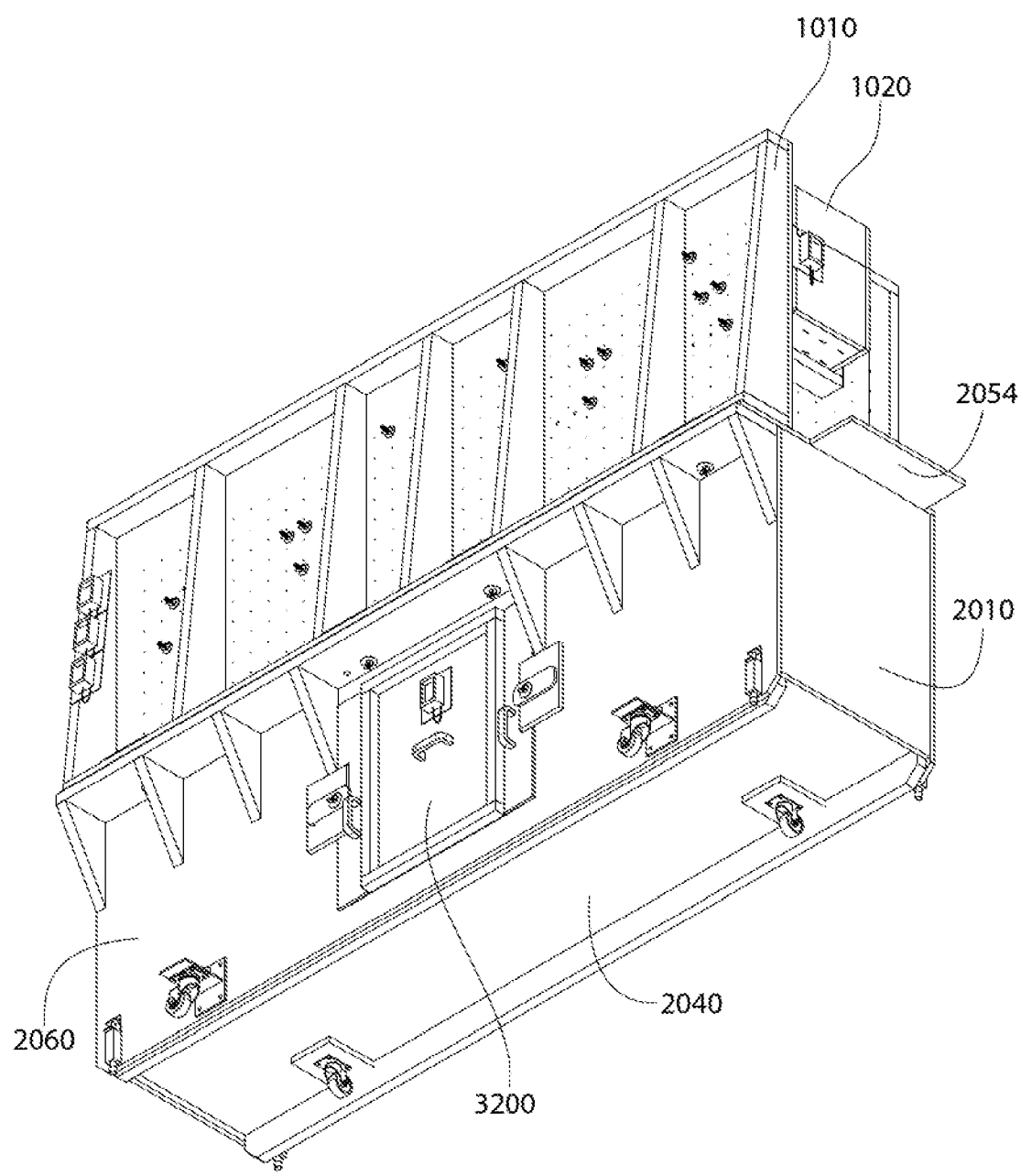
FIG. 4 is a rear lower perspective view of the test cabinet shown in FIG. 1.

FIGS. 2-4 show four wheels or casters 2001 mounted to the bottom of base 2000 to facilitate movement of cabinet 10. Other embodiments, have fewer, more, or no wheels or casters. Also shown are four leveling devices 2002 that are activated manually or automatically to level cabinet 10 and/or lift cabinet 10 off of one or more of casters 2001.

FIGS. 3 and 4 shows the rear of cabinet 10. These views show the exterior of rear insert 3200 and its securing mechanisms (discussed in detail below in reference to FIG. 17). In this example, rear insert 3200 is inserted into base 2000 from the back side of base 2000. In other embodiments, rear insert 3200 is inserted into base 2000 from the front side of base 2000.

Figure 5:
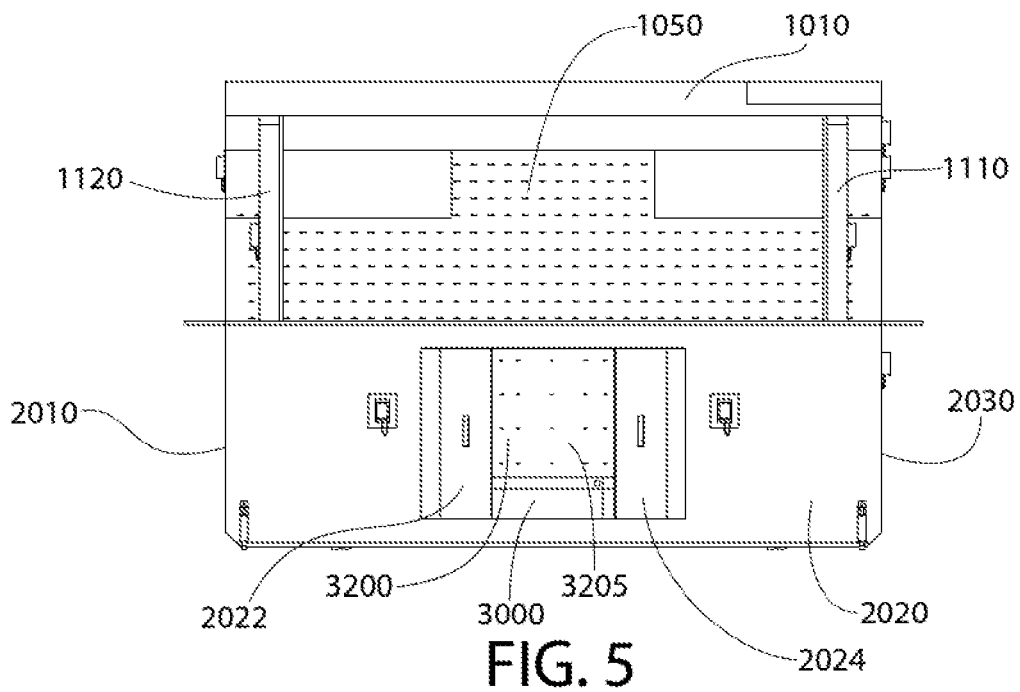
FIG. 5 is a front view of the test cabinet shown in FIG. 1.
Figure 6:
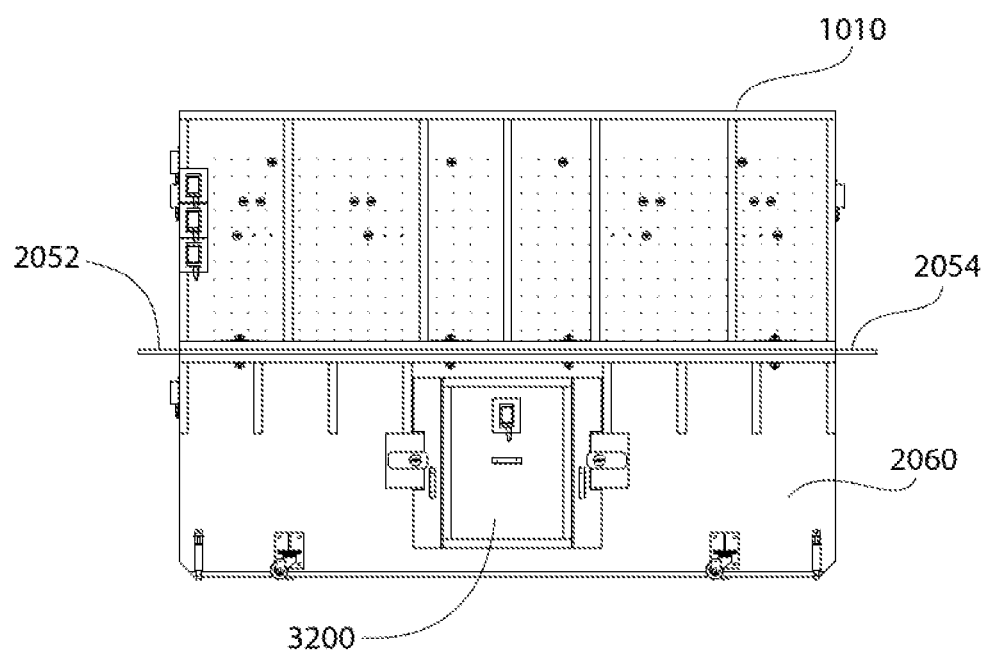
FIG. 6 is a rear view of the test cabinet shown in FIG. 1.
Figure 7:
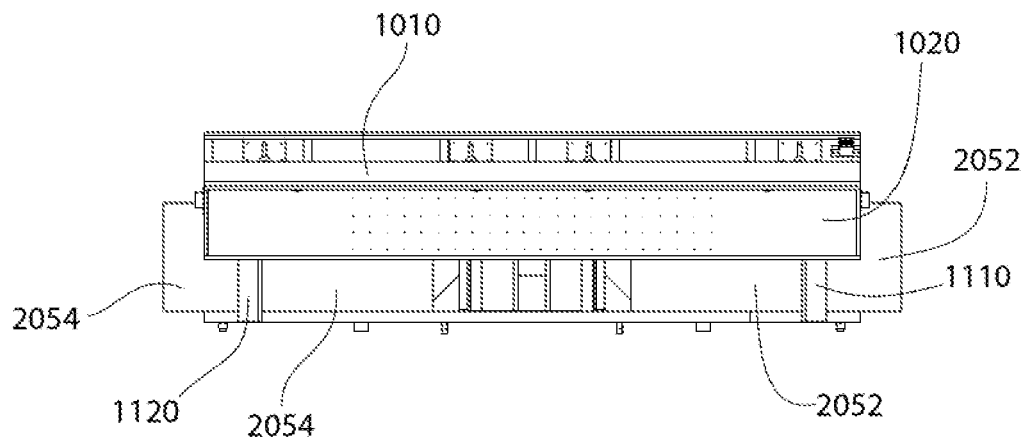
FIG. 7 is a top view of the test cabinet shown in FIG. 1.

FIG. 5 is a front view of cabinet 10. In FIG. 5, compartment rear wall 3205 of rear insert 3200, and bottom insert 3000 are visible in/through compartment 100. FIG. 6 is a rear view of cabinet 10. FIG. 6 shows rear insert 3200 secured in position on rear panel 2060 of base 2000. Also shown in Fig. are the various fasteners used to attach top portion 1020 and blocks 1030, 1040 to back wall 1050. FIG. 7 is a top view of cabinet 10, FIG. 8 is a right side view of cabinet 10, and FIG. 9 is a left side view of cabinet 10.

Figures 8, 9:
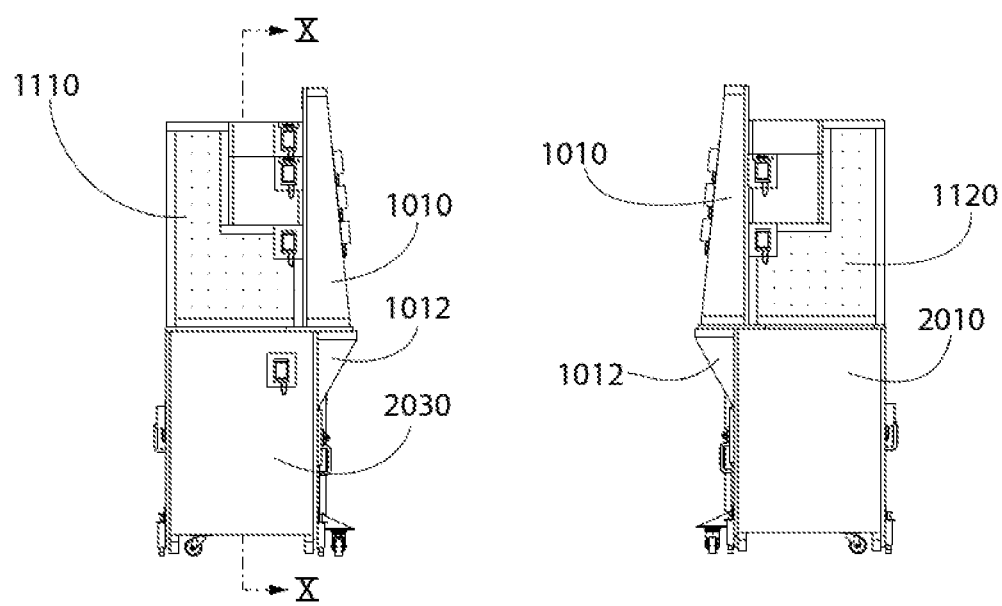
FIG. 8 is a right side view of the test cabinet shown in FIG. 1.
FIG. 9 is a left side view of the test cabinet shown in FIG. 1.

FIG. 10 is a sectional view of cabinet 10 taken along section line X-X in FIG. 8. The mounting system for mounting blocks 1030, 1040 is shown in this example as openings with angled top edges and clamping pieces with similarly angled top edges. Block 1030 has two openings 1032, each of which having an angled top edge. A clamping piece 1052 that has an angled top edge that mates with the angled top edge of opening 1032 is provided at each opening 1032. Clamping pieces 1052 are bolted (or otherwise attached) to back wall 1050 such that openings 1032 (and thus block 1030) slide side-to-side (in the direction of arrow A). When the correct position of block 1030 is achieved, the bolts are tightened to clamp block 1030 tightly to back wall 1050 such that block 1030 cannot move relative to back wall 1050. The angled upper edged of openings 1032 and clamping pieces 1052 prevent block 1030 from falling off of clamping pieces 1052 during movement of block 1030. Block 1040, openings 1042, and clamping pieces 1054 are similarly configured.

Figure 11:
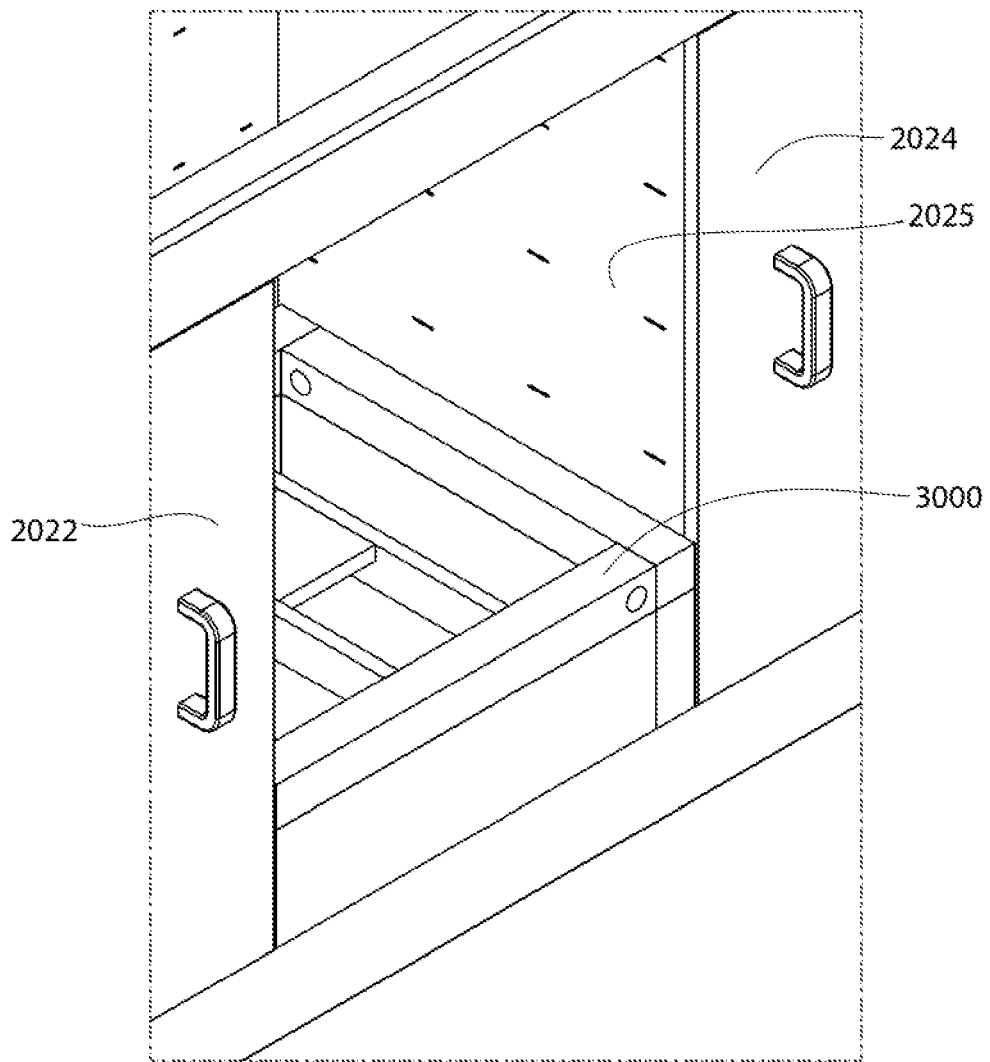
FIG. 11 is a magnified view of the indicated area in FIG. 1.

FIG. 11 is a magnified view of the area marked in FIG. 1. FIG. 11 shows bottom insert 3000 as having a perimeter support and an open central section. In other embodiments, bottom insert 3000 has a solid platform on which the oven sits. In still other embodiments, bottom insert 3000 has a solid platform with a number of openings.

FIGS. 12-15 show an example of bottom insert 3000 and rear insert 3200. While shown together in these views, it is noted that, in this example, bottom insert 3000 and rear insert 3200 are two separate elements. In other embodiments, bottom insert 3000 and rear insert 3200 are one unit.

In the example shown in FIGS. 12-15, rear insert 3200 has a number of spacers 3210, 3215 positioned between a back panel 3220 and compartment rear wall 3205. Spacers 3210, 3215, along with the thicknesses of back panel 3220 and compartment rear wall 3205 determine the position (in the direction of arrow B) of an inside face of compartment rear wall 3205 relative to a rear panel of the oven. For a given back panel 3220 and compartment rear wall 3205, different sized spacers 3210, 3215 can be interchanged to alter the overall thickness of rear insert 3200. In some embodiments, a different complete rear insert 3200 having a different thickness is used when a different thickness is needed. The use of a different complete rear insert 3200 greatly reduces the time required to adjust the cabinet for testing of an oven having a different depth in the direction of arrow B. As can be seen in FIGS. 12 and 13, back panel 3220 is, in this example, wider than compartment rear wall 3205. In embodiments, for a given cabinet 10, back panel 3220 matches the size of an opening in rear panel 2060 of base 2000, regardless of the width of compartment rear wall 3205. This feature provides a closed rear panel 2060 regardless of the size of compartment rear wall 3205.

In the example shown in FIGS. 12-15, bottom insert 3000 comprises four side members 3105, 3110, 3115, 3120 that form an open box-shaped structure that acts as a support for the oven placed in compartment 100. In embodiments, a panel the same size as the top of the open box structure is placed on the open box structure to simulate the bottom panel of a kitchen cabinet. In embodiments, the width in the direction of arrow A of the box-shaped structure equals the width of compartment rear wall 3205. With these two dimensions equal, compartment inside walls 2025 contact both rear insert 3000 (at an edge of compartment back wall 3205) and bottom insert 3000. In this manner, a closed back and sides of compartment 100 are formed.

Figure 15:
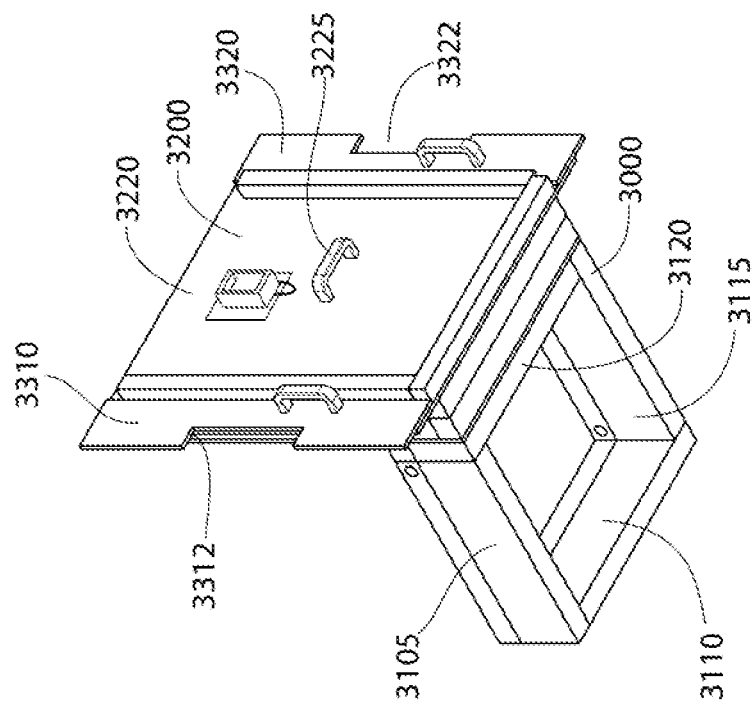
FIG. 15 is a rear lower perspective view of the part shown in FIG. 12.
Figure 14:
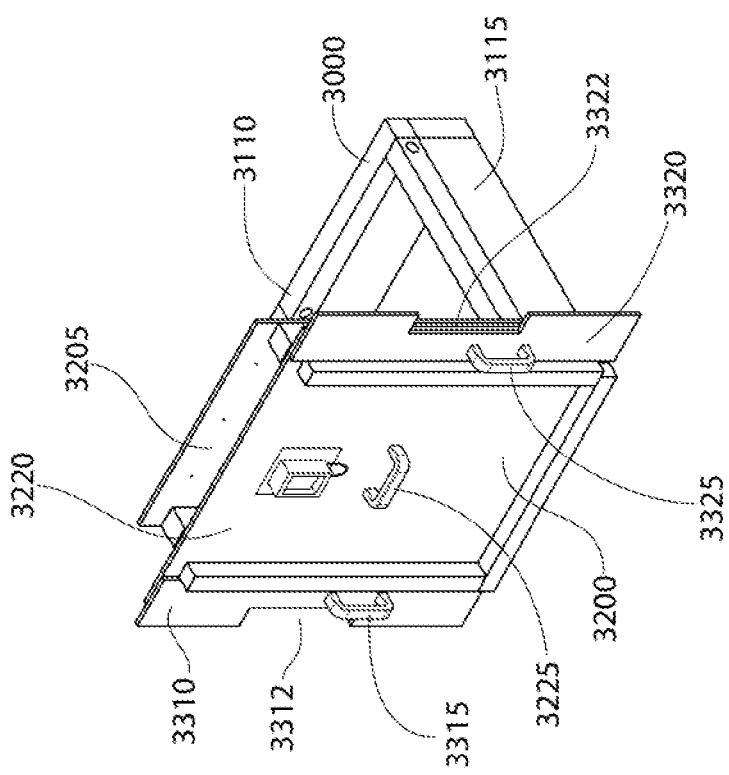
FIG. 14 is a rear upper perspective view of the part shown in FIG. 12.

FIGS. 14 and 15 show rear views of rear insert 3200. Back panel 3220 of rear insert 3200 has, in this example, two overlap pieces 3310, 3320 that have notches 3312, 3322, respectively. Overlap pieces 3310, 3320 cover the joint between back panel 3220 of rear insert 3200 and rear panel 2060 of base 2000. Notches 3312, 3322 are parts of a locking mechanism (shown in FIGS. 16 and 17) that locks rear insert 3200 in place in base 2000. Also shown in FIGS. 14 and 15 are three handles 3225, 3315, 3325 that are used to position rear insert 3200.

FIGS. 16 and 17 show the locking mechanism used to secure rear insert 3200 to base 2000. FIG. 16 shows a swinging element 2063 rotatably mounted to a plate 2062 and a swinging element 2065 rotatably mounted to a plate 2064. Plates 2062, 2064 fit inside notches 3322, 3312, respectively. When in the position shown in FIG. 16, swinging elements 2063, 2065 pass through notches 3322, 3312 as rear insert slides into position in base 2000. Once rear insert 3200 is in position in base 2000, swinging elements 2063, 2065 are moved to the positions shown in FIG. 17 so that a portion of each of swinging elements 2063, 2065 extends beyond notches 3322, 3312 and prevents rear insert 3200 from moving relative to base 2000 in the direction of arrow B. When rear insert is to be removed from base 2000, swinging elements 2063, 2065 are moved to the positions shown in FIG. 16 to allow notches 3322, 3312 to clear swinging elements 2063, 2065.

The dashes shown in the figures on compartment inside wall 2025, compartment rear wall 3205, the underside of top panels 2052, 2054, backwall 1050, blocks 1030, 1040, and sidewalls 1110, 1120 represent temperature sensors used to detect temperatures on these respective surfaces. Temperature sensors can also be provided on other, or fewer, surfaces of cabinet 10. Embodiments can also include other sensors or monitoring equipment such as, for example, distance sensors.

Figure 18:
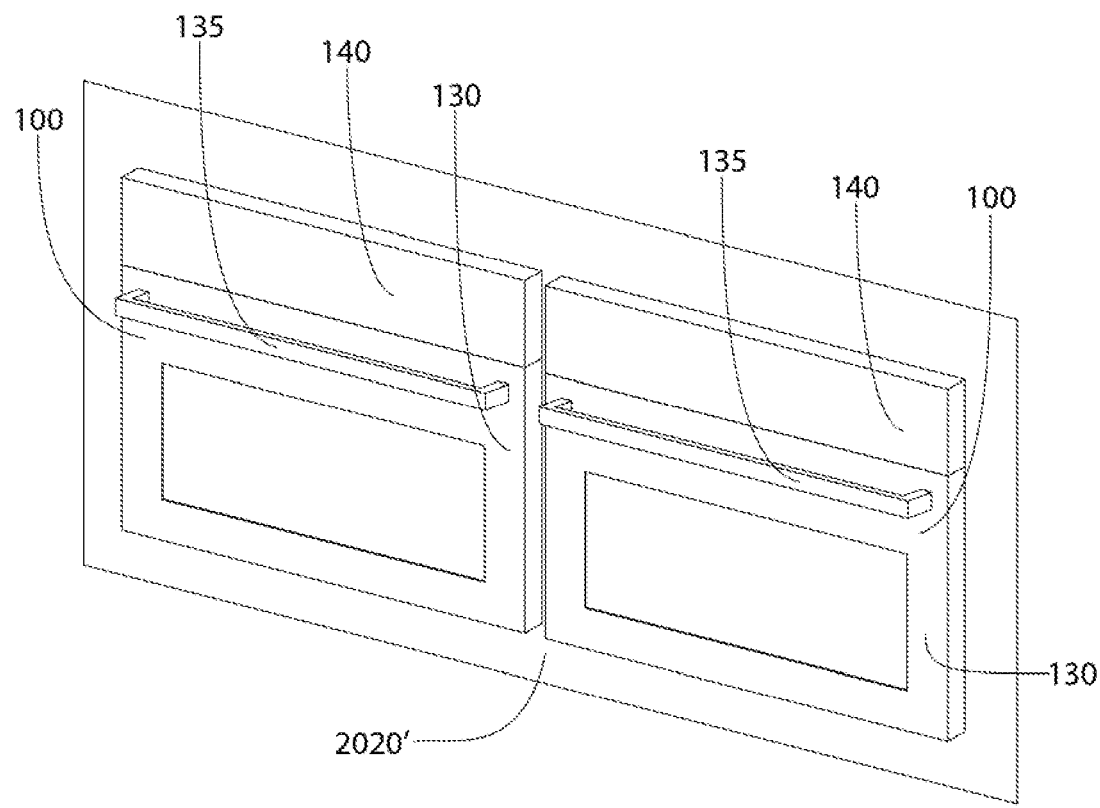
FIG. 18 is a front upper perspective view of a side-by-side oven arrangement.

FIGS. 1-17 show an example of a test cabinet that is configured for a single oven. FIGS. 18-22 show an example of a test cabinet 10' that is configured to test two ovens placed side-by-side. FIG. 18 shows an example of two ovens 100 in position in a front panel 2020' of test cabinet 10'. Each oven 100 has a door 130, a handle 135, and a control panel 140.

Cabinet 10' has many of the same features as cabinet 10, some of which are not repeated here. It is noted, however, that all or some of the features of cabinet 10 are included in various embodiments of side-by-side test cabinet 10'. For example, although not shown in the figures, embodiments of cabinet 10' include upper structure 1000 or a similar structure.

In this example, cabinet 10' has compartment inside walls 2025' similar to cabinet 10. A middle divider 4010 separates the two compartments 100' from one another. Divider 4010 is removable to simulate installations where there is not divider between the two ovens. In this example, each compartment 100' has its own bottom insert 5010, 5020. In this example, bottom insert 5010 can have a different thickness in the direction of arrow C than bottom insert 5020, which permits two ovens of different height (or just different bottom elevation) to be tested. In other embodiments, one bottom insert is used and extends below both compartments 100'.

Figure 19:
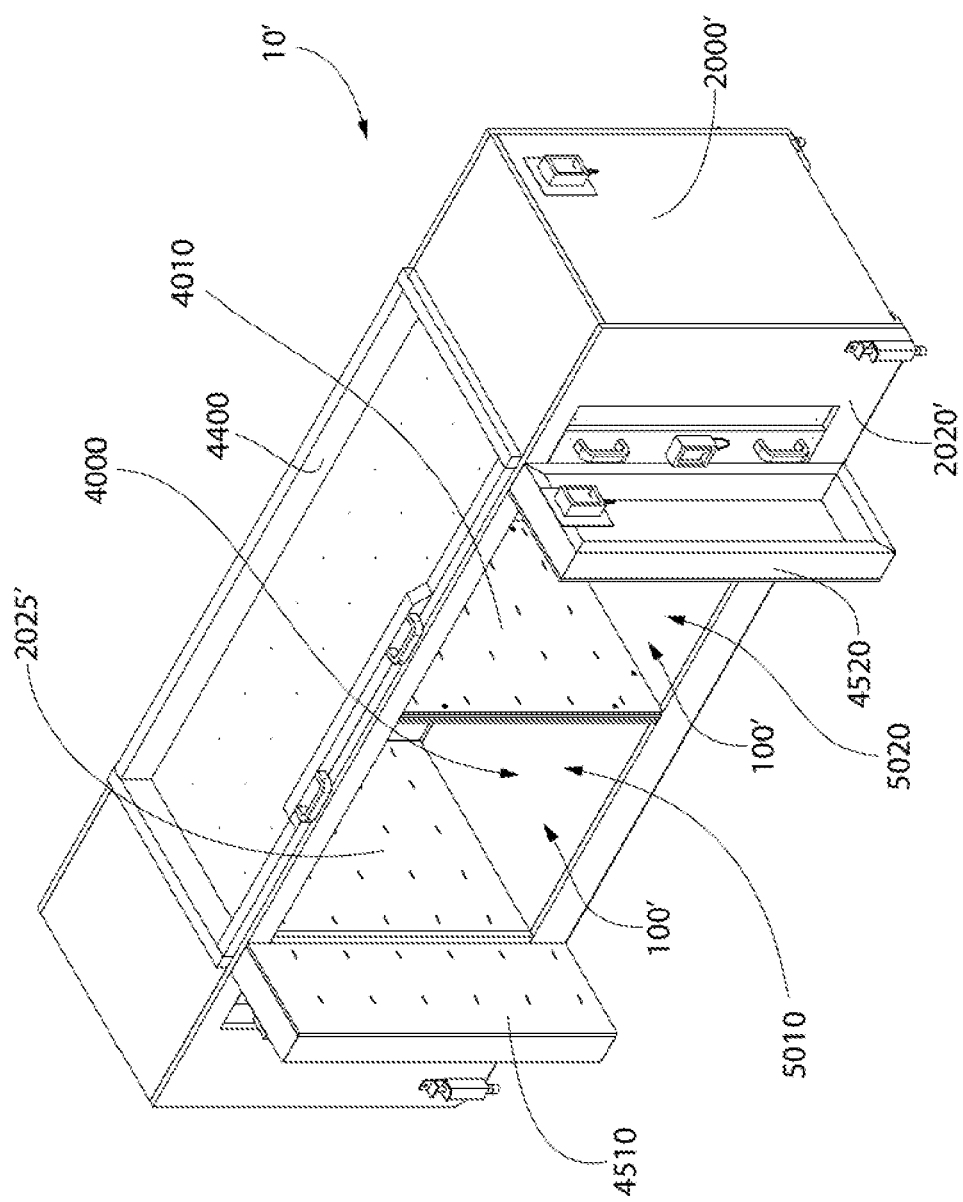
FIG. 19 is a front upper perspective view of an exemplary double test cabinet in accordance with embodiments of the invention.

FIG. 19 shows a top insert 4400 that is removably located above compartments 100'. Top insert 4400 can be replaced by one or more cooktops for testing the cooktops and/or ovens in compartments 100'. Two side wall extensions 4510, 4520 are shown extending forward beyond front panel 2020'. Side wall extensions 4510, 4520 are used to simulate installations where an oven is located in close proximity to a wall that extends perpendicularly (or at some other angle) to the wall in which the oven is installed. Depending on the installation being tested, one, both, or none of side wall extensions 4510, 4520 can be used. Side wall extensions 4510, 4520 can also be used with cabinet 10. In embodiments, side wall extensions 4510, 4520 are fixed to cabinet inside walls 2025'. In other embodiments, side wall extensions 4510, 4520 move independently from cabinet inside walls 2025'.

Figure 20:
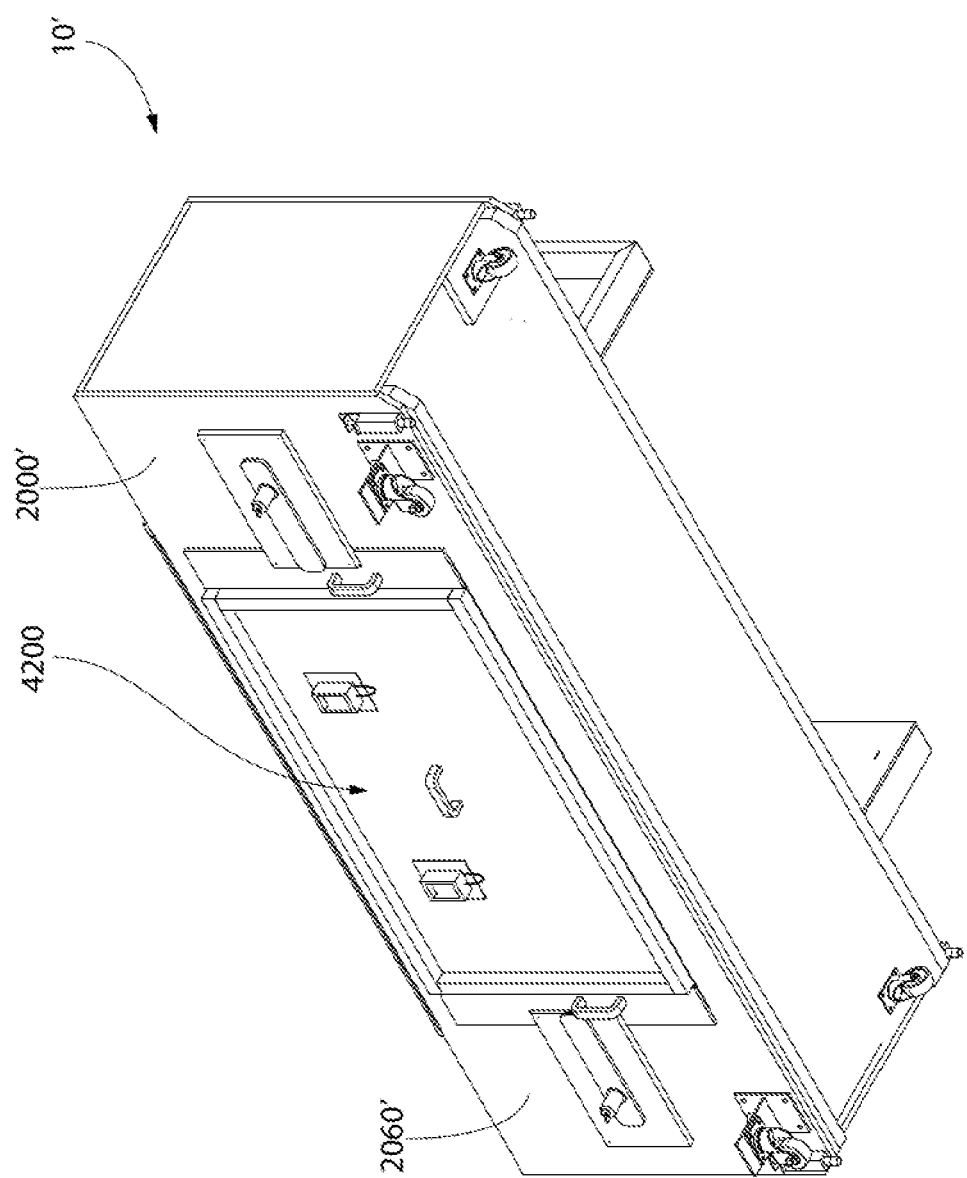
FIG. 20 is a rear lower perspective view of the double test cabinet shown in FIG. 19.
Figure 21:
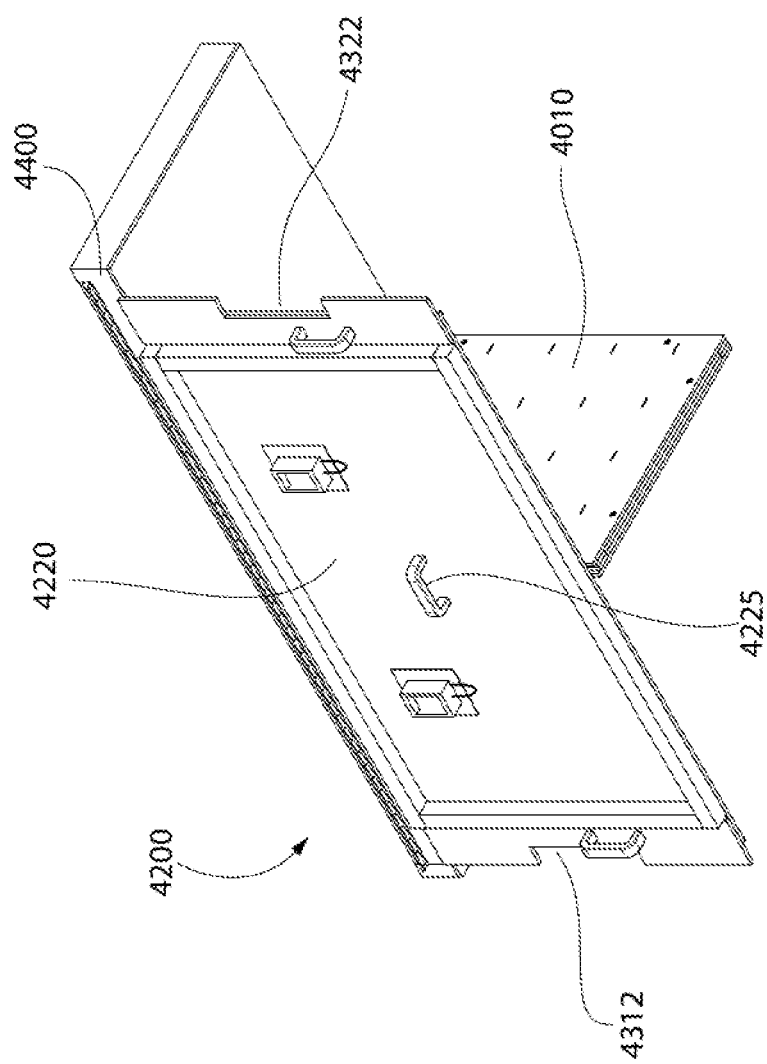
FIG. 21 is a rear lower perspective view of a part of the double test cabinet shown in FIG. 19.
Figure 22:
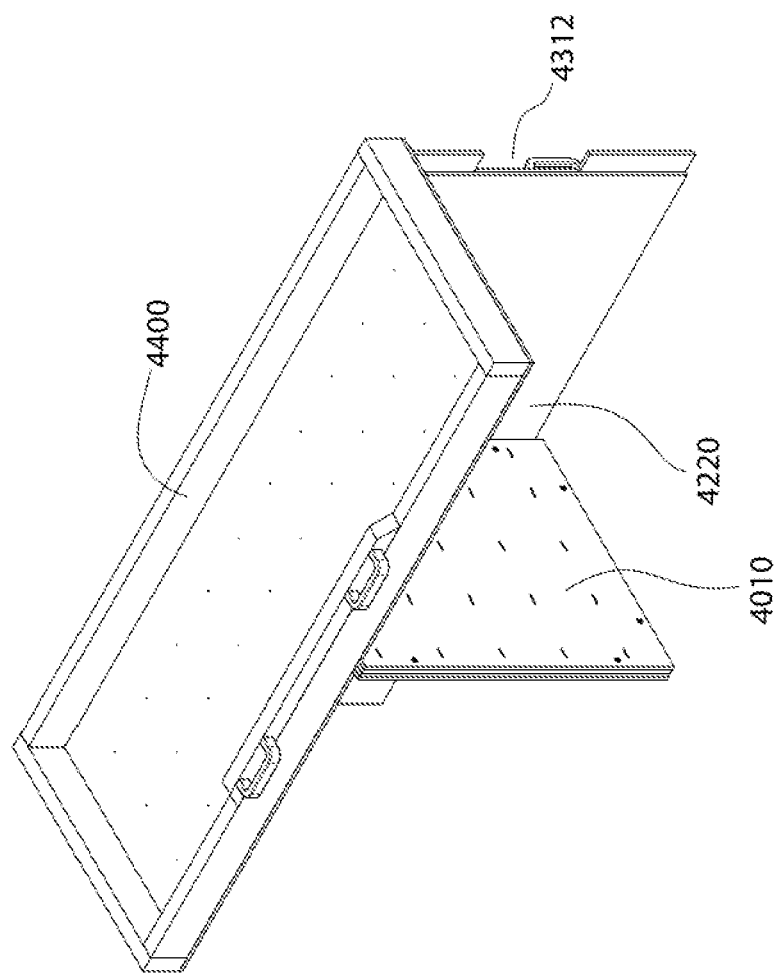
FIG. 22 is a front upper perspective view of the part shown in FIG. 21.

FIGS. 20-22 show a rear insert 4200 that is positioned in rear panel 2060' of base 2000' similarly to how rear insert 3200 fits in base 2000. Rear insert 4200 has a back panel 4220 that corresponds to back panel 3220 of rear insert 3200. Rear insert 4200 has notches 4312, 4322 that correspond to notches 3313, 3322 if rear insert 3200, and a handle 4225. Similarly to rear insert 3200, multiple rear inserts 4200 having different thicknesses in the direction of arrow B can be interchanged to provide compartments 100' with different depths. Also, in embodiments, divider 4010 is movable to different positions on back panel 4220 for cases where ovens of different widths are tested together.

While top insert 4400 is shown for reference in FIGS. 21 and 22, it is noted that in this example, top insert 4400 and rear insert 4200 are separate pieces that can be in interchanged independently from one another.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A test cabinet for testing a heat generating appliance, the cabinet comprising:
 a base having a main structure, a front panel, a rear panel, and a top panel, the top panel being movable relative to the main structure, the front panel extending in a longitudinal direction of the cabinet;
 a front opening in the front panel, the front opening providing access to an appliance compartment in the base, the appliance compartment being configured to receive the heat generating appliance;
 a back wall positioned above the top panel and movable relative to the main structure, the back wall being movable in a depth direction of the cabinet, the depth direction being perpendicular to longitudinal direction of the cabinet;
 a height adjustable bottom insert that is removably mounted in the base, the bottom insert forming a floor of the appliance compartment, the floor having an adjustable elevation;
 a compartment inside wall moveably mounted to the base, the compartment inside wall forming an interior wall of the appliance compartment, the compartment inside wall being movable in the longitudinal direction of the cabinet;
 a rear insert, the rear insert having a compartment rear wall that forms an interior rear wall of the appliance compartment; and
 a side wall positioned above the top panel and movable relative to the main structure, the side wall being movable in the longitudinal direction of the cabinet.

2. The cabinet of claim 1, wherein the compartment rear wall is non-coplanar with the rear panel of the base.

3. The cabinet of claim 1, wherein the rear insert is insertable and removable through an opening in the rear panel of the base.

4. The cabinet of claim 1, wherein the back wall is movable to a position in which the back wall is at least partially above the top panel.

5. The cabinet of claim 1, wherein the top panel is movable in the longitudinal direction of the cabinet.

6. A test cabinet for testing a heat generating appliance, the cabinet comprising:
 a base having a main structure, a front panel, a rear panel, and a top panel, the top panel being movable relative to the main structure, the front panel extending in a longitudinal direction of the cabinet;
 a front opening in the front panel, the front opening providing access to an appliance compartment in the base, the appliance compartment being configured to receive the heat generating appliance;
 a back wall positioned above the top panel and movable relative to the main structure, the back wall being movable in a depth direction of the cabinet, the depth direction being perpendicular to longitudinal direction of the cabinet;
 a height adjustable bottom insert that is removably mounted in the base, the bottom insert forming a floor of the appliance compartment, the floor having an adjustable elevation;
 a compartment inside wall moveably mounted to the base, the compartment inside wall forming an interior wall of the appliance compartment, the compartment inside wall being movable in the longitudinal direction of the cabinet; and
 a rear insert, the rear insert having a compartment rear wall that forms an interior rear wall of the appliance compartment,
 wherein the top panel is movable in the longitudinal direction of the cabinet.

7. The cabinet of claim 6, further comprising a side wall positioned above the top panel and movable relative to the main structure, the side wall being movable in the longitudinal direction of the cabinet.

8. The cabinet of claim 6, wherein the compartment rear wall is non-coplanar with the rear panel of the base.

9. The cabinet of claim 8, wherein the rear insert is insertable and removable through an opening in the rear panel of the base.

10. A test cabinet for testing a heat generating appliance, the cabinet comprising:
 a base having a main structure, a front panel, a rear panel, and a top panel, the top panel being movable relative to the main structure, the front panel extending in a longitudinal direction of the cabinet;
 a front opening in the front panel, the front opening providing access to an appliance compartment in the base, the appliance compartment being configured to receive the heat generating appliance;
 a back wall positioned above the top panel and movable relative to the main structure, the back wall being movable in a depth direction of the cabinet, the depth direction being perpendicular to longitudinal direction of the cabinet;
 a height adjustable bottom insert that is removably mounted in the base, the bottom insert forming a floor of the appliance compartment, the floor having an adjustable elevation;
 a compartment inside wall moveably mounted to the base, the compartment inside wall forming an interior wall of the appliance compartment, the compartment inside wall being movable in the longitudinal direction of the cabinet; and
 a rear insert, the rear insert having a compartment rear wall that forms an interior rear wall of the appliance compartment,
 wherein the back wall comprises a block that is slidably movable relative to the back wall in the longitudinal direction of the cabinet.

* * * * *